United States Patent [19]

Davis et al.

[11] Patent Number: 4,711,265
[45] Date of Patent: Dec. 8, 1987

[54] SPRING AND WASHER DEVICE

[75] Inventors: Ronald G. Davis, Anderson; Charles D. Denniston, Middletown; Richard K. Van Skyock, Yorktown, all of Ind.

[73] Assignee: General Motors Corporation, Detroit, Mich.

[21] Appl. No.: 26,192

[22] Filed: Mar. 16, 1987

[51] Int. Cl.$^4$ .................................. F15B 13/044
[52] U.S. Cl. ........................ 137/454.2; 137/625.65; 251/129.21
[58] Field of Search ............... 137/454.2, 625.65; 251/129.21

[56] References Cited

U.S. PATENT DOCUMENTS

| | | |
|---|---|---|
| 4,376,606 | 3/1983 | Peterson ........................... 411/155 |
| 4,513,780 | 4/1985 | Evans ............................... 137/625.65 |
| 4,552,179 | 11/1985 | Tarusawa et al. ................ 137/625.65 |

FOREIGN PATENT DOCUMENTS 1917261 10/1970 Fed. Rep. of Germany ... 137/454.2

Primary Examiner—Gerald A. Michalsky
Attorney, Agent, or Firm—Saul Schwartz

[57] ABSTRACT

A combination spring and washer device which facilitates pin-type cantilever mounting of a solenoid valve having a tubular plastic body on a transmission control valve body. The plastic body of the solenoid valve has a relatively heavy coil at a coil end thereof and is plugged into a pressure bore in the control valve body so that the coil is supported in cantilever beam fashion. A minimum wall thickness flux gap portion of the plastic body is located between the control valve body and the coil end of the plastic body. The spring and washer device is snap fitted over the flux gap portion and includes a flat washer portion which bears against a flange on the plastic body on one side of the flux gap portion. The spring and washer device further includes a pair of integral spring arms which bear against the coil body which is disposed on the other side of the flux gap portion so that the flux gap portion is preloaded in tension. The magnitude of the preload is calculated to balance the dynamic beam bending forces which occur during normal vehicle operation due to the concentration of the mass of the coil at the coil end of the plastic body.

3 Claims, 4 Drawing Figures

SPRING AND WASHER DEVICE

BACKGROUND OF THE INVENTION

1. Field of the Invention

This invention relates generally to combination spring and washer devices and, more particularly, to a spring and washer device which facilitates pin-type cantilever mounting of a solenoid valve having a plastic body.

2. Description of the Prior Art

U.S. patent application Ser. No. 751,875, filed July 5, 1985 by Ronald G. Davis et al and assigned to the assignee of this invention, describes a solenoid valve particularly suited to automotive transmission applications. The valve has a tubular plastic body in which is disposed a fixed valve orifice and a slidable valve plunger for opening and closing the valve orifice. A solenoid coil for moving the valve plunger is disposed around the tubular plastic body at a first or coil end of the latter. The electromagnetic force (EMF) developed when electric current flows through the coil passes through the tubular plastic body at a flux gap portion of the latter. The wall thickness of the plastic body at the flux gap portion is purposely made as thin as possible to maximize the efficiency of the coil. A second or O-ring end of the tubular plastic body is adapted for insertion into a fluid pressure bore in a support structure such as a transmission control valve body. A mounting strap on a housing around the solenoid coil is adapted for rigid attachment to the support structure whereby the valve is held in the pressure bore and the relatively heavy coil is supported independently of the tubular plastic body.

In automobile transmission applications where available space renders it impractical to use the aforesaid strap mounting arrangement, a pin-type cantilever mounting arrangement may be resorted to as an alternative. In the pin-type cantilever mounting arrangement, the O-ring end of the plastic body is inserted or plugged into the pressure bore with the coil end extending away form the support structure on the opposite side of the flux gap portion from the O-ring end. The tubular plastic body thus functions as a cantilever beam with the coil mass concentrated at its distal end and with the relatively thin walled flux gap portion located between the distal end and the support structure. Fluid pressure forces on the valve urging the tubular plastic body out of the pressure bore are resisted by stationary pins on the support structure which intersect the pressure bore behind a flange on the plastic body. A combination spring and washer device according to this invention, in the aforesaid pin-type cantilever mounting arrangement for a solenoid valve, operates to retard dynamic cantilever beam bending of the plastic body at the flux gap portion and to avoid plastic creep at the interface between the retaining pins and the flange on the plastic body.

SUMMARY OF THE INVENTION

This invention is a new and improved spring and washer device particularly suited for a pin-type cantilever mounting arrangement for a solenoid valve having a tubular plastic body plugged into a pressure bore in a support structure, the plastic body having an O-ring end in the pressure bore, a distal or coil end with a solenoid coil thereon, and a thin-walled flux gap portion between the O-ring end and the coil end. The pin-type mounting arrangement includes a pair of retaining pins on the support structure which intersect the pressure bore on opposite sides of the tubular body and behind an annular flange on the latter whereby the tubular body is held on the support structure against pressure forces in the fluid pressure bore. The spring and washer device according to this invention is disposed around the flux gap portion and includes a C-shaped flat washer portion, a pair of integral webs at diametrically opposite locations on the flat washer portion, and a pair of spring arms on the distal ends of the webs projecting radially inward toward the plastic body. The flat washer portion is located between the flange on the plastic body and the retaining pins and distributes compression forces across a face area of the flange to prevent plastic creep. The spring arms engage a surface of the solenoid valve parallel to the flat washer portion so that the flux gap portion of the plastic body is preloaded in tension. The preload is calculated to exceed the dynamic cantilever beam bending forces on the plastic body which are produced during normal vehicle operation as a result of the concentration of the coil mass at the coil end of the plastic body so that cantilever beam bending of the plastic body is retarded.

BRIEF DESCRIPTION OF THE DRAWINGS

Referring now to FIG. 1 of the drawings, a solenoid valve 10 generally as described in the aforesaid patent application serial number 751875 is attached to a support structure such as an automobile transmission control valve body 12 through a pin-type cantilever mounting arrangement. The control valve body 12 includes a bottom wall 14 and a vertical planar wall 16 intersecting the bottom wall. The control valve body 12 further includes a fluid pressure bore 18 extending perpendicular to and intersecting the planar wall 16. A cylindrical counterbore portion 20 of the fluid pressure bore 18 has an annular bottom shoulder 22 in a plane parallel to the planar wall 16. A schematically illustrated passage 24, FIG. 1, delivers hydraulic fluid under pressure to the pressure bore 18.

Figure 1:
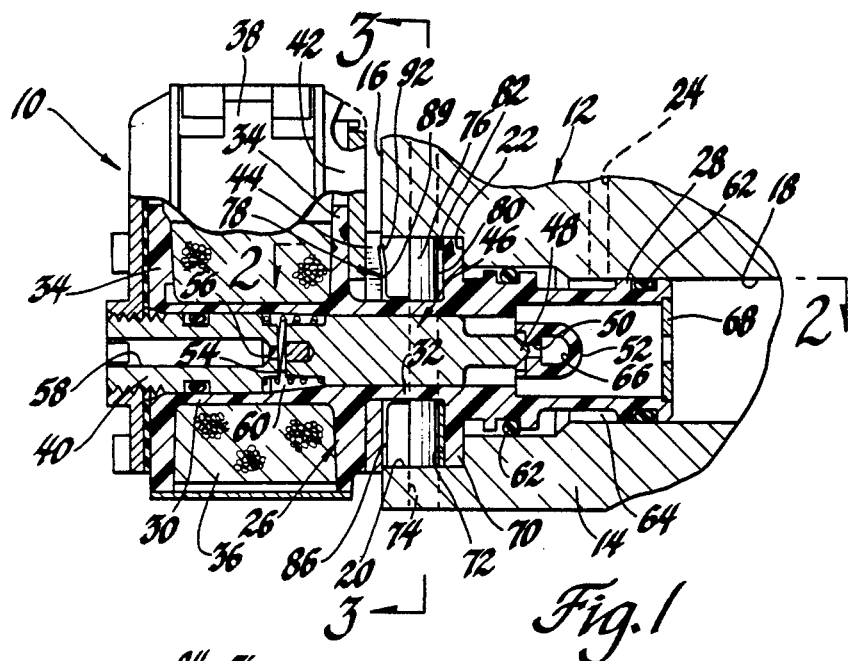
FIG. 1 is an elevational view, partly in section, of a solenoid valve mounted on a support structure through a pin-type cantilever mounting arrangement with a combination spring and washer device according to this invention disposed around a plastic body of the solenoid valve.
Figure 2:
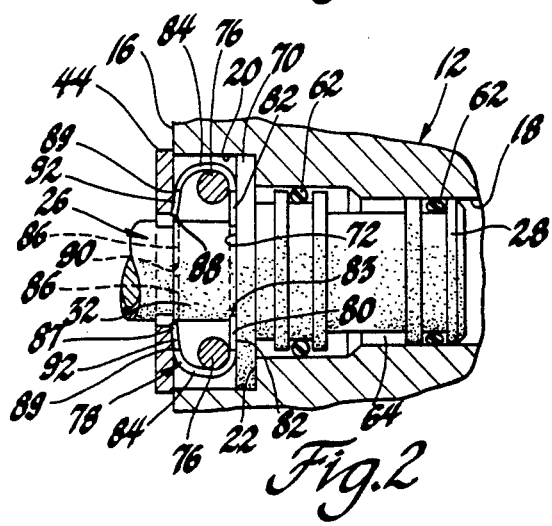
FIG. 2 is a sectional view taken generally along the plane indicated by lines 2—2 in FIG. 1.

The solenoid valve 10 includes a tubular plastic body 26 having an O-ring end 28, a coil end 30 and a flux gap portion 32 between the coil end and the O-ring end. The coil end has a pair of integral annular walls 34. A solenoid coil 36 is wound around the plastic body 26 between the walls 34. A metal housing 38 surrounds the coil 36 and the walls 34 and is attached to one end of a stationary core 40 disposed within and projecting beyond the left end of the coil end 30 of the plastic body 26. The housing 38 has a front cover 42 which abuts an inverted U-shaped stop plate 44 straddling the flux gap portion 32 of the plastic body. The stop plate 44, the front cover 42, and the core 40 are each fabricated of magnetically permeable material.

The solenoid valve 10 further includes an armature or plunger 46 slidably disposed in the plastic body 26 at the flux gap portion 32. The plunger 46 has a pointed end 48 which cooperates with a valve orifice 50 in a transverse hollow web 52 of the plastic body 26. The plunger 46 has a flat end 54 opposite the pointed end 48 which cooperates with an exhaust orifice 56 in the core 40 which leads to an enlarged exhaust passage 58 in the core. A spring 60 between the core and the plunger biases the pointed end 48 into seating engagement on the valve orifice 50. Appropriate grooves, not shown, are provided in the plunger whereby fluid is permitted to flow axially within the valve body 26 to the exhaust orifice 56.

A pair of O-rings 62 are seated in appropriate external grooves on the O-ring end 28 of the plastic body 26 and engage the inside of fluid pressure bore 18. The O-rings define pressure seals at opposite ends of an annular chamber 64 in fluid communication with the schematically illustrated passage 24 in the transmission control valve body 12. The annular chamber 64 is in fluid communication with the valve orifice 50 through an internal passage 66 in the web 52. The interior of the O-ring end 28 of the plastic body is in fluid communication with the fluid pressure bore 18 to the right of the plastic body through a perforated plate 68 attached to the O-ring end 28. When the pointed end 48 of the plunger 46 is seated in the valve orifice 50, the fluid pressure bore 18 is connected to the exhaust passage 58 through the perforated plate 68, around the plunger 46, and through the exhaust orifice 56. When the flat end 54 of the plunger closes the exhaust orifice 56, the pointed end 48 is withdrawn from the valve orifice 50 so that pressurized fluid flows to the fluid pressure bore 18 through the annular chamber 64, the internal passage 66, and the perforated plate 68.

The plastic body 26 has an integral flange 70 at one end of the flux gap portion 32 which defines an annular face 72 in a plane perpendicular to the longitudinal axis of the plastic sleeve. The outside diameter of the flange 70 corresponds generally to the diameter of the counterbore 20. The O-ring end 28 of the plastic body 26 is inserted or plugged into the pressure bore 18 until the flange 70 on the plastic sleeve 26 abuts the bottom shoulder 22 of the counterbore 20. The flange 70 and the O-ring end of the plastic body are closely received in the counterbore and the pressure bore, respectively, whereby the solenoid valve is supported in cantilever fashion on the transmission control valve body 12.

Figure 3:
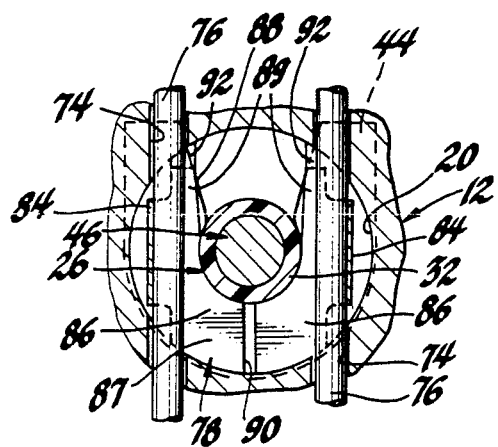
FIG. 3 is a sectional view taken generally along the plane indicated by lines 3—3 in FIG. 1.

The transmission control valve body 12 has a pair of pin bores 74, FIG. 3, disposed in a plane parallel to the planar wall 16. Each pin bore 74 intersects the counterbore 20 and the bottom wall 14. A pair of cylindrical pins 76 are tightly received in corresponding ones of the pin bores 74 and extend across the counterbore 20 to the left of the flange 70 on the plastic body 26. The pins 76 straddle the plastic body generally at the flux gap portion 32 and, as described hereinafter, foreclose withdrawal of the plastic body 26 from the pressure bore 18.

A combination spring and washer device 78 according to this invention is disposed around the flux gap portion 32 within the counterbore 20. The spring and washer device 78 includes a C-shaped flat washer portion 80 having an inside diameter generally equal to the outside diameter of the flux gap portion 32 of the plastic body 26. A pair of opposing ends 82 of the washer portion 80 are disposed on opposite sides of a throat 83 thereof which is slightly smaller than the outside diameter of the flux gap portion 32 of the plastic body.

Figure 4:
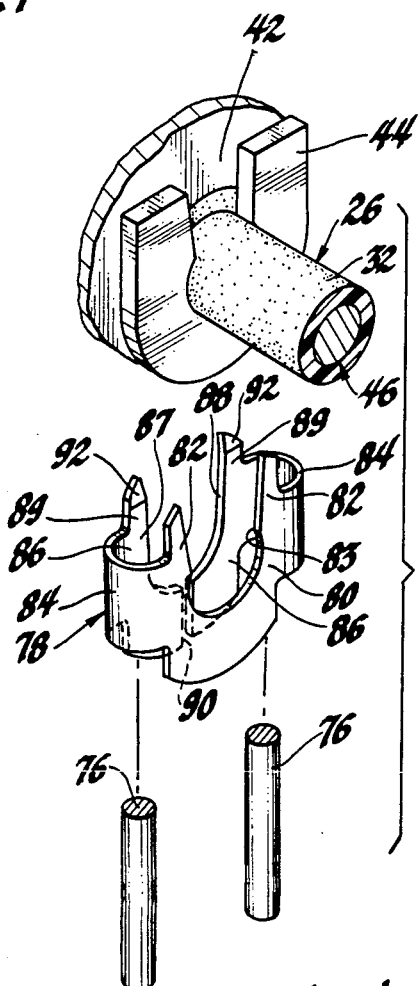
FIG. 4 is a perspective view of a portion of the solenoid valve and of the combination spring and washer device according to this invention.

The spring and washer device 78 further includes a pair of connecting webs 84, FIGS. 3 and 4, integral with the flat washer portion 80 and located diametrically opposite each other thereon. Respective ones of a pair of spring arms 86 integral with corresponding ones of the connecting webs 84 extend toward each from the connecting webs. The spring arms 86 cooperate to define a generally U-shaped split wall 87 of the spring and washer device 78 opposite the flat washer portion 80. The U-shaped split wall 87 has a throat 88 between a pair of opposing ends 89, FIGS. 3 and 4, which is the same diameter as the flux gap portion 32 of the plastic body 26. The spring arms 86, however, are separated or split at the bottom by a narrow gap 90 so that each of the spring arms 86 is flexible independently of the other. Each of the opposing ends 89 on the spring arms 86 has an outwardly bent tang 92 thereon, FIG. 4.

The spring and washer device 78 is installed on the plastic body 26 before the plastic body is plugged into the pressure bore 18. As best seen in FIGS. 3 and 4, the spring and washer device 78 is oriented relative to the solenoid valve such that the flat washer portion 80 and the split wall 87 open in the same direction as the stop plate 44. The spring and washer device 78 is then snapped over the plastic body 26 at the flux gap portion 32 with the opposing ends 82 on the flat washer portion being sprung slightly by the flux gap portion as the latter passes through the throat 83. The spring and washer device 78 is self retaining on the plastic body 26. The outwardly bent tangs 92 snap behind a receptacle formed by the inside edges of the vertical legs of the stop plate 44 so that the spring and washer device 78 is not rotatable relative to the plastic body 26.

With the spring and washer device 78 thereon, the O-ring end 28 of the plastic body 26 is plugged into the pressure bore 18 until the flange 70 seats against the bottom shoulder 22 of the counterbore 20. The plastic body is rotated in the pressure bore 18 until the connecting webs 84 are oriented generally vertically, FIGS. 3 and 4. The cylindrical pins 76 are then inserted in the pin bores 74 through the bottom wall 14 of the control valve body 12 and forced vertically to positions wherein each pin traverses the counterbore 20. In the counterbore 20, the pins are located on the opposite side of the flat washer portion 80 from the annular face 72 of the flange 70 on the plastic body. With fluid pressure in the pressure bore 18, the flat washer portion 80 distributes the compression forces exerted by the pins 76 on the annular face 72 across substantially the full area of the face to avoid plastic creep. The pins 76 are captured between the connecting webs 84 in straddling relationship with respect to the flux gap portion 32 of the plastic body so that the solenoid valve 10 is not rotatable relative to the transmission control valve body 12.

In a natural or unflexed condition, FIG. 4, the spring arms 86 diverge from the flat washer portion 80 to impart to the spring and washer device 78 an axial thickness dimension which somewhat exceeds the axial distance between the annular face 72 on the flange 70 of the plastic body and the opposite surface of the stop plate 44. When the spring and washer device 78 is snapped onto the plastic body as described, the spring arms 86 are flexed toward the flat washer portion 80 and remain flexed as long as the spring and washer device 78 is on the plastic body. The flexed spring arms 86 cooperate with flat washer portion 80 to impose oppositely directed tensile preload forces on the plastic body 26 across the flux gap portion 32. The magnitude of the tensile preload on the flux gap portion depends upon the spring rate of the spring arms 86 and is calculated to produce tensile forces exceeding dynamic compressive forces which would otherwise develop in normal vehicle operation due to dynamic cantilever beam bending of the plastic body 26 resulting from the concentration of the mass of the coil 36 at the coil end 30 of the plastic body. Accordingly, beam bending of the plastic body at the flux gap portion 32 is retarded.

The embodiments of the invention in which an exclusive property or privilege is claimed are defined as follows:

1. In a pin-type cantilever mounting arrangement for a solenoid valve on a control valve body;

said control valve body including a planar wall, a fluid pressure bore perpendicular to and intersecting said planar wall, and a counterbore in said planar wall around said fluid pressure bore; and said solenoid valve including a tubular plastic body having an O-ring end and a coil end separated by a minimum wall thickness flux gap portion, an annular plastic flange on one side of said flux gap portion, and a coil body rigidly connected to said sleeve on the other side of said flux gap portion at said coil end;

said O-ring end of said sleeve being plugged into said pressure bore with said annular flange abutting the bottom of said counterbore whereby said coil body end and said flux gap portion of said plastic body are supported on said control valve body in cantilever beam fashion with said flux gap portion in said counterbore;

said plastic body being retained in said pressure bore by a pair of retaining pins disposed on said control valve body and intersecting said counterbore on opposite sides of said plastic body adjacent said annular flange of said plastic body;

a combination spring and washer device comprising:

a C-shaped planar flat washer portion disposed around said flux gap portion of said plastic body between said annular flange and each of said retaining pins, said flat washer portion distributing compression forces between said retaining pins and said annular flange across said annular flange to prevent plastic creep, a pair of integral webs at diametrically opposite locations on said flat washer portion extending generally perpendicular to the plane of said flat washer portion, and a pair of spring arms integral with respective ones of said webs extending radially inward toward said plastic body and resiliently engaging said coil body thereby to impose preload tensile forces on said plastic body across said flux gap portion, the magnitudes of said preload tensile forces being calculated to substantially equal dynamic compression forces on said plastic body produced by cantilever beam bending of said plastic body due to concentration of the mass of said coil body at said coil end of said plastic body.

2. The combination spring and washer device recited in claim 1 and further including means defining a locating tang on each of said spring arms, and receptacle means on said coil body operative to receive corresponding ones of said locating tangs when said spring and washer device is disposed on said plastic body whereby rotation of said spring and washer device relative to said solenoid valve is prevented.

3. The combination spring and washer device recited in claim 2 wherein each of said integral webs is located on said flat washer portion such that said retaining pins are captured between said integral webs so that rotation of said solenoid valve in said pressure bore is positively foreclosed.

* * * * *